United States Patent [19]
Dunder et al.

[11] 3,831,978
[45] Aug. 27, 1974

[54] DRIVE TRANSMISSION FOR A BICYCLE OR THE LIKE

[75] Inventors: David Dunder, Glendora; Sheldon Wiley, Los Gatos, both of Calif.

[73] Assignee: Trans World Products, Inc., San Jose, Calif.

[22] Filed: Mar. 12, 1973

[21] Appl. No.: 340,194

[52] U.S. Cl. .................. 280/238, 74/116, 280/244
[51] Int. Cl. ............................................ B62m 23/00
[58] Field of Search .......... 280/238, 236, 244, 259, 280/260, 261, 249, 246, 256; 74/116, 122, 125.5

[56] References Cited
UNITED STATES PATENTS

| | | | |
|---|---|---|---|
| 528,956 | 11/1894 | Lippy | 280/238 |
| 2,449,266 | 9/1948 | Woods | 280/256 |
| 3,259,398 | 7/1966 | Hattan | 280/236 |
| 3,437,162 | 4/1969 | Diehl | 280/236 X |
| 3,633,938 | 1/1972 | Solomon | 280/246 X |
| 3,759,543 | 9/1973 | Clark | 280/236 |

*Primary Examiner*—Robert R. Song
*Attorney, Agent, or Firm*—Phillips, Moore, Weissenberger, Lempio & Strabala

[57] ABSTRACT

A drive transmission for a bicycle or the like including a housing having a pair of spaced shafts journaled for rotation within the housing. A sprocket is fixedly secured to each of the shafts and a plurality of spaced cams are mounted off-center on one of the shafts for rotation with respect to the shaft on which they are mounted. A like number of spaced one-way clutches are mounted on the other shaft for free rotation in one direction with respect to the other shaft and fixed rotation in the other direction with respect to the other shaft. The clutches are aligned with their respective cams and resilient means interconnect each of the clutches with its aligned cam. In this manner, when the sprocket on the shaft having the cams thereon is rotated, such as by a bike pedal connected thereto, the clutches are turned in the one-way direction for a short distance on their respective shafts due to the interconnecting resilient means. If a resistance to turning is placed on the shaft having the clutches thereon, such as by interconnection of the rear wheel of a bike to the sprocket thereon, more tension is placed on the resilient means than it can overcome. Accordingly, the resilient means, which may be either an extension or compression spring, extends or compresses to rotate clutches to a lesser degree, thereby automatically changing the turning ratio between the pedal sprocket and the rear wheel.

12 Claims, 5 Drawing Figures

PATENTED AUG 27 1974
3,831,978
SHEET 1 OF 2
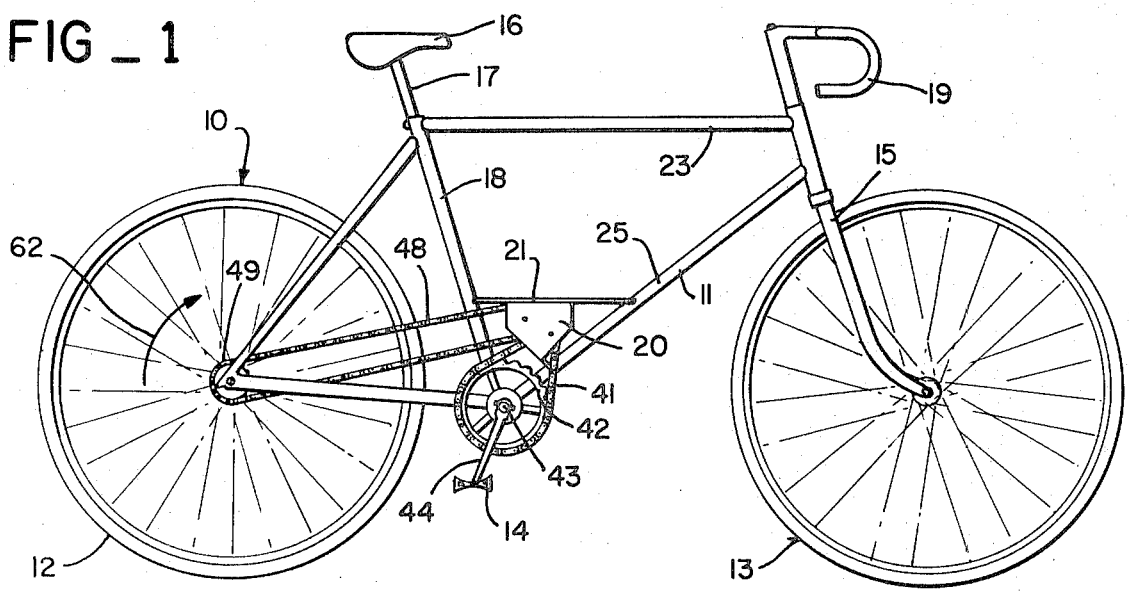
FIG_1
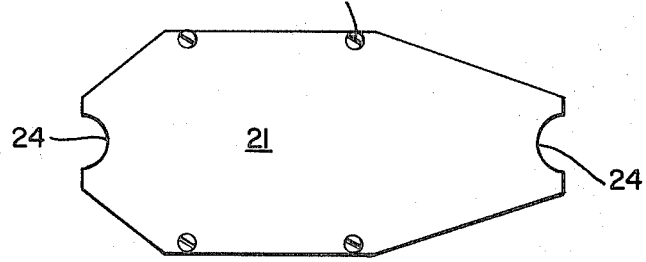
FIG_3
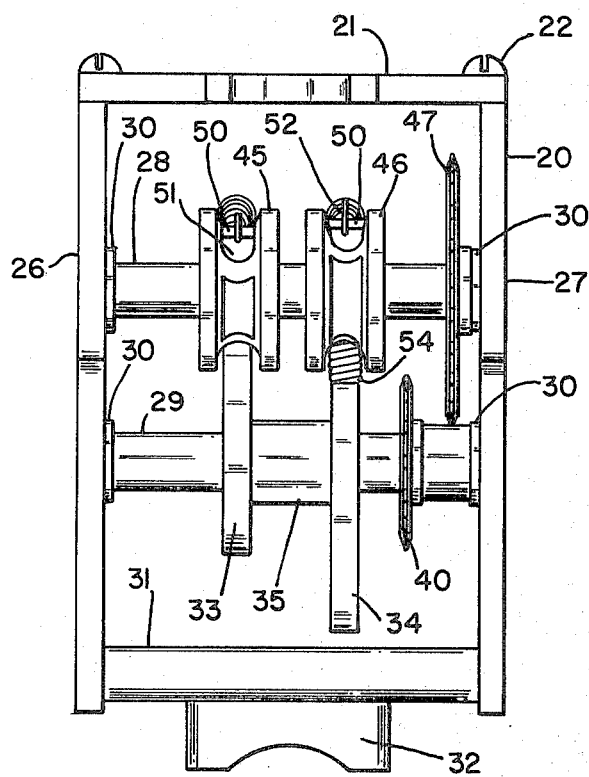
FIG_4

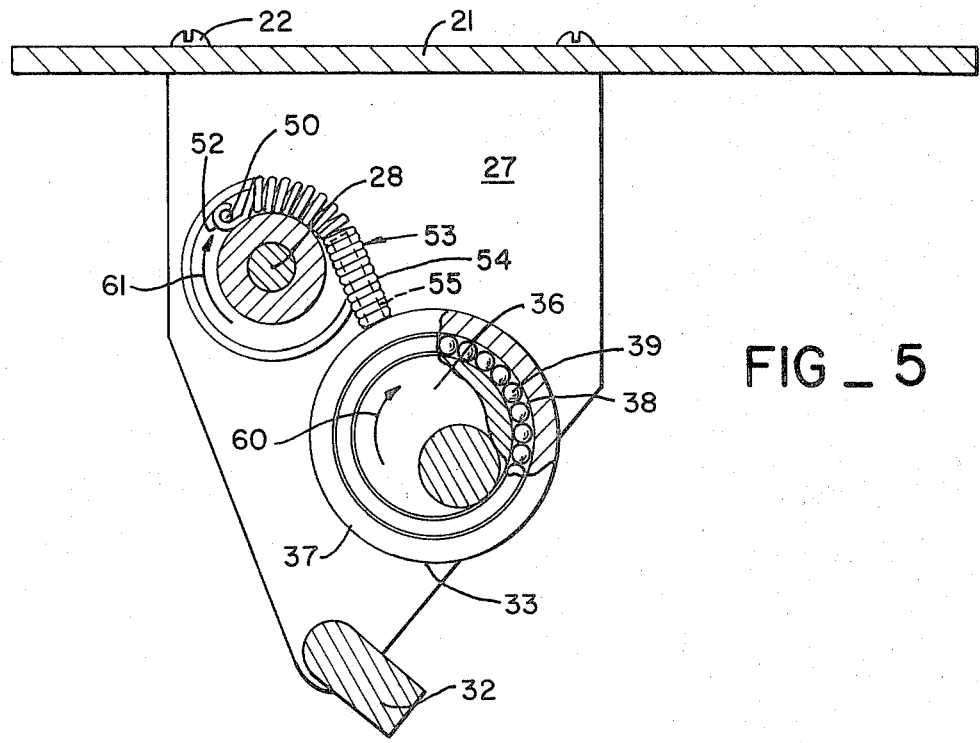
FIG _ 5
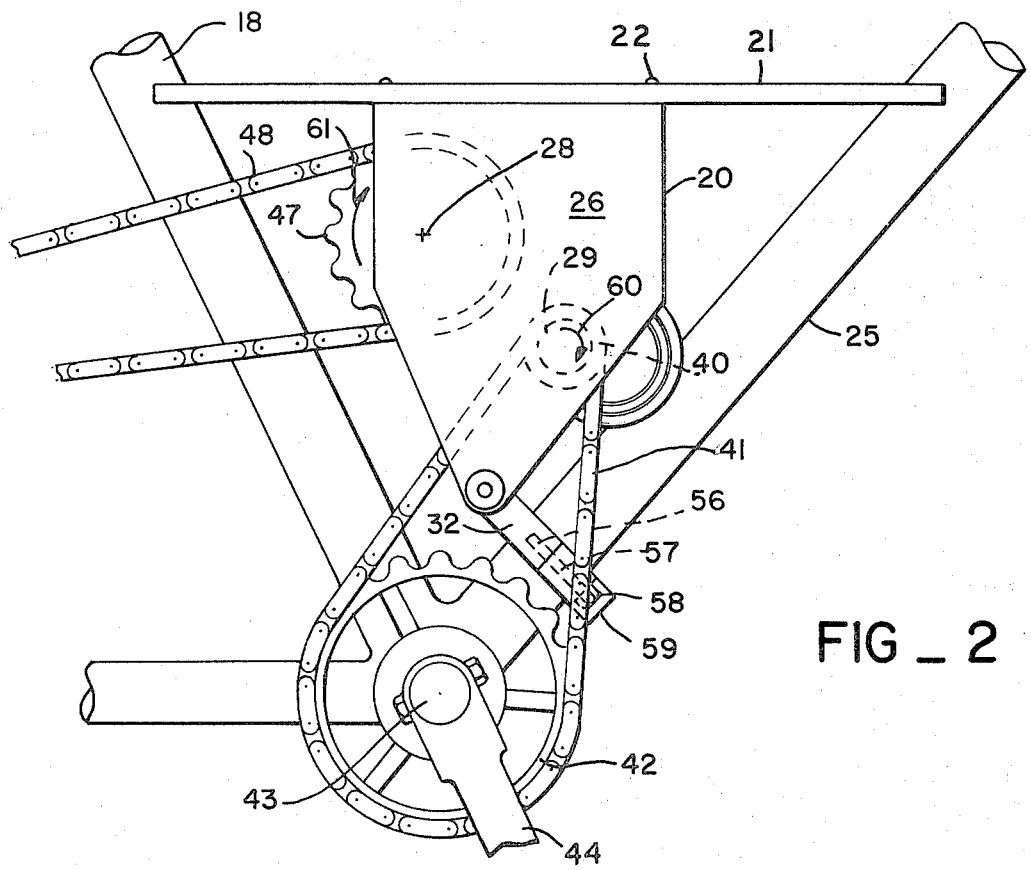
FIG _ 2

DRIVE TRANSMISSION FOR A BICYCLE OR THE LIKE

BACKGROUND OF THE INVENTION

1. Field of the Invention

The invention relates to drive transmissions; and, more particularly, to a drive transmission for a bicycle or the like.

2. Description of the Prior Art

There has been a great revival of interest in recent years in the use of bicycles or the like. This is due in part to the lack of exercise by most people and in part to the pollution caused to the environment by automobiles or the like. This revival has revolved pretty much about multi-speed bicycles, particularly, 10-speed bicycles. These bicycles have means thereon for varying the transmission ratio imparted to the rear wheel of the bicycle so that this ratio can be adjusted in accordance with the speed attained and in accordance with the nature of the terrain encountered, such as a hill or the like. Conventional transmission ratio changing means used today on most 10-speed bicycles or the like is the so-called "derailleur" mechanism. This generally involves the use of a manually operated lever to move a chain, during movement of the bicycle, from one sprocket to another sprocket of greater or lesser diameter. Many problems are encountered in the use of such systems since the chain, lever and sprockets must be kept in close alignment to carry out the foregoing operations. There thus exists a need for a system of changing or varying the transmission ratio between the rear wheel of a bicycle or the like and the pedal used to operate the bicycle. Such means should be mechanically efficient yet inexpensive to manufacture and easy to use.

SUMMARY OF THE INVENTION

It is an object of this invention to provide a drive transmission for a bicycle or the like which automatically adjusts the transmission ratio between the rear wheel and the pedal sprocket without the use of levers or other complicated mechanisms.

It is a further object of this invention to provide such a drive transmission which has a relatively infinite number of ratios between the rear wheel and the pedal sprocket.

It is still a further object of this invention to carry out the foregoing objects, while the bicycle is in motion, in a quick, easy and mechanically efficient manner.

These and other objects are preferably accomplished by providing a drive transmission for a bicycle or the like which includes a housing having a pair of spaced shafts journaled for rotation within the housing. A sprocket is fixedly secured to each of the shafts and a plurality of spaced cams are mounted off-center on one of the shafts for rotation with respect to the shaft on which they are mounted. A like number of spaced one-way clutches are mounted on the other shaft for free rotation in one direction with respect to the other shaft and fixed rotation in the other direction with respect to the other shaft. The clutches are aligned with their respective cams and resilient means interconnect each of the clutches with its aligned cam. In this manner, when the sprocket on the shaft having the cams thereon is rotated, such as by a bike pedal connected thereto, the clutches are turned in the one-way direction for a short distance on their respective shafts due to the interconnecting resilient means. If a resistance to turning is placed on the shaft having the clutches thereon, such as by interconnection of the rear wheel of a bike to the sprocket thereon, more tension is placed on the resilient means than it can overcome. Accordingly, the resilient means, which may be either an extension or compression spring, is either compressed or extended to rotate the clutches to a lesser degree, thereby automatically changing the turning ratio between the pedal sprocket and the rear wheel.

BRIEF DESCRIPTION OF THE DRAWING

FIG. 1 is a perspective view of a bicycle incorporating the drive transmission of our invention;

FIG. 2 is a side view of the drive transmission alone of the bicycle of FIG. 1;

FIG. 3 is a top plan view of the mounting plate of the transmission of FIGS. 1 through 3;

FIG. 4 is an end view of the transmission of FIGS. 1 and 2; and

FIG. 5 is a side view, partly in section, showing the operation of the drive transmission of FIGS. 1 through 3.

DESCRIPTION OF THE PREFERRED EMBODIMENT

Referring now to FIG. 1 of the drawing, a bicycle 10 is shown having a frame 11, a rear driving wheel 12, a front wheel 13 and a pedal 14, the bicycle 10 also includes a fork 15 interconnecting the front wheel 13 to frame 11 and a seat 16 mounted on a seat post 17 secured to the tubing 18 of frame 11. Handlebars 19 are mounted at the top of fork 15 to complete bicycle 10.

The foregoing has described in brief detail the conventional portions of a bicycle. The novel feature of the bicycle 10 of my invention includes a housing 20 (see particularly FIG. 2) depending from a top mounting plate 21 (see FIG. 3) which is secured thereto by screws 22 or the like. This plate 21 extends below tubular member 23 of frame 11 as shown. Thus, plate 21 (see FIG. 3) may include cut-out portions 24 at each end to straddle the tubing 18 and the tubing 25 of frame 11 as shown in FIG. 1.

As shown in FIGS. 3 and 4, housing 20 includes a pair of spaced side plates 26, 27 extending downwardly from plate 21. Screws 22 secure plate 21 to plates 26, 27. A pair of spaced shafts 28, 29 extend between plates 26, 27 and are mounted for rotation therein by means of suitable bearing members 30. The lower ends of plates 26, 27 are fixedly secured by a tubular member 31 which may be bolted or the like to plates 26, 27. A yoke member 32 is carried at generally the midpoint of member 31 for straddling tubing 25 of frame 11 (see FIG. 2).

As can be seen in FIGS. 2 and 5, shafts 28, 29 are vertically offset from one another. At least two cams 33, 34 are mounted at spaced locations on shaft 29. A spacer 35 keyed for rotation with shaft 29 may be used to separate cams 33, 34. As can be seen in FIG. 5, each cam 33, 34 (only cam 33 being shown) includes a central portion 36 fixedly secured to shaft 29 by any suitable means, such as welding or the like. An annular portion 37 extends about central portion 36 and a race 38 having ball bearings 39 therein separates central portion 36 from annular portion 37 so that member 37 rotates in either direction about portion 36. As can be seen in FIGS. 4 and 5, the cams 33, 34 are offset on shaft 29 and are also offset from one another. That is, the cam 34 is mounted on shaft 29 at a point opposite where shaft 29 is secured to cam 33.

A sprocket 40 (see FIG. 4) is fixedly secured to shaft 29. As can be seen in FIGS. 1 and 2, a chain 41 extends about sprocket 40 and a pedal sprocket 42 which is fixedly secured to a pedal shaft 43 operatively connected to pedal supports 44 carrying pedals 14 at their lower ends. As pedals 14 are rotated, pedal sprocket 42 is rotated, which roates sprocket 40 via chain 41. Thus, shaft 29 is rotated.

Referring once again to FIG. 4, the upper shaft 28 includes at least a pair of one-way clutches 45, 46 which are mounted for free rotation in only one direction on shaft 28. If desired, spacers (not shown) may be provided to space clutches 45, 46 from one another and from plates 26, 27. A sprocket 47 is fixedly secured to shaft 28. As can be seen in FIG. 2, a chain 48 extends about both sprocket 47 and a sprocket 49 (FIG. 1) for rotating the rear wheel 12 of bicycle 10 as is well known in the bicycle art. The particular structure for imparting rotation from sprocket 49 to wheel 12 is well known in the art and further description is deemed unnecessary.

Referring once again to FIG. 4, the clutches 45, 46 are annularly grooved as shown and each clutch 45, 46 includes a pin 50 or the like extending between the walls forming the grooves 51 for receiving the hooked end 52 of a spring 53 (see also FIG. 5). The opposite or free end 54 of each spring 53 is adapted to receive therein an extension member 55 (shown in dotted lines in FIG. 5) integral with the annular portion 37 of each cam 33, 34. Of course, any suitable means may be provided for securing the free ends of springs 53 to their respective cam and clutch. Further, any suitable number of cam-clutch-spring arrangements may be provided depending in part upon the space available in housing 20. Each arrangement includes, as shown in FIG. 4, a generally vertically aligned clutch, cam and interconnecting tensioning member. Obviously, means other than springs may also be used, such as torsion bars or the like.

As shown in FIG. 2, the free ends of the yoke member 32 may include threaded apertures 56 therein for receiving the threaded shafts 57 of bolts 58 so that, by passing bolts 58 through suitable apertures in locking plate 59, the yoke member 32 may be securely mounted to tubing 25. The spacing between cams 33, 34 is such that tubing 25 may pass therebetween.

In operation, referring to FIGS. 1 and 2, as pedals 14 are operated to rotate pedal sprocket 42, the lower shaft 29 (FIG. 4) is rotated in the direction of arrow 60 in FIGS. 2 and 5. Since annular portions 37 of cams 33, 34 are fixed for rotation to central portions 36, portions 37 do not rotate with shaft 29 due to springs 53. Since springs 53 are connected to clutches 45, 46, and since cams 33, 34 are offset from one another, the springs 53 rotate clutches 45, 46 in their one-way direction for rotation of shaft 28 (i.e., in the direction of arrow 61 in FIGS. 2 and 5). Since sprocket 47, via chain 48, is coupled to rear wheel sprocket 49, the rear wheel 12 is rotated in the direction of arrow 62 in FIG. 1. Thus, the rear wheel 12 is rotated via pedals 14 to drive bicycle 10 in a forward direction.

When the rear wheel 12 has a greater resistance to turning than the tension of springs 53 can overcome, springs 53, which may be either extension springs or compression springs, either extend or compress to rotate clutches 45, 46 to a lesser degree, thereby automatically changing the turning ratio between the pedal sprocket 42 and the rear wheel 12 of bicycle 10. Thus, for example, should the rider of bicycle 10 approach a hill or the like, more resistance is placed on rear wheel 12 due to both the weight of the rider and the hill encountered. This stretches or compresses springs 53 and a greater degree of turning of pedal sprocket 42 is required to rotate rear wheel 12. The relationship of springs 53 to cams 33, 34 and clutches 45, 46 may be preset so that a zero point is not approached. That is, the bite of the clutches 45, 46, via springs 53, is always some degree of turn, for example, 5° to 10°. A ratio is thereby established between the low and high speeds required to rotate rear wheel 12.

Although two such cams 33, 34, two such clutches 45, 46, and their interconnecting springs 53 have been described, this number may vary. For example, if three such arrangements were used, at least two such spring-clutch-cam arrangements would always be functioning at any one time; as one arrangement dropped off, another would be starting.

Although extension or compression springs 53 have been described, any suitable resilient means may be used. For example, torsion bars may be substituted for the springs 53. The drive transmission of our invention results in a 1:5 ratio of the highgear side. That is, turning pedals 14 one full turn rotates the rear wheel 12 five turns. In the low-gear side, a 1:1/2 ratio results. That is, rotation of pedals 14 one full turn rotates the rear wheel 12 one-half full turn. These ratios are appreciably better than the ratios obtained with the derailleur systems of conventional 10-speed bicycles. Such ratios generally range from a high-gear ratio of less than 1:4 to a low-gear ratio of more than 1:1. Thus, the drive transmission of my invention is more flexible.

Although the housing 20 is shown as mounted on bicycle 10 in a position where cams 33, 34 must straddle each side of and clear tubing 25, the housing 20 may be located higher so that such clearance is not necessary. Alternatively, the cams 33, 34 may be so located in housing 20 so that no clearance of tubing 25 is necessary.

It can be seen from the foregoing that I have described a drive transmission for a bicycle or the like which is more flexible and more efficient than conventional bicycle drive transmissions. Further, a wider range of ratios is present over conventional multi-speed bicycles between the pedals and the rear wheel on which the drive transmission of my invention is mounted.

We claim as our invention:
1. A drive transmission for a bicycle or the like including:
 a housing;
 a pair of spaced shafts journaled for rotation within said housing;
 a sprocket fixed for rotation with its respective shaft mounted on each of said shafts;
 a plurality of spaced cams rotatably mounted on one of said shafts, said cams being mounted off-center both on said one of said shafts and with respect to one another;

a like plurality of spaced clutches mounted on the other of said shafts and rotatable thereon in only one direction, each of said clutches being aligned with its respective cam on the said one of said shafts; and a like plurality of resilient means operatively connected at one end to one of said cams and at its other end to the clutch aligned with said one of said cams for imparting rotation to its respective clutch in its one-way direction on its respective shaft when said shaft on which said cams are mounted is rotated.

2. The drive transmission of claim 1 wherein said cams are generally annular with an inner portion fixedly secured to said one of said shafts and an outer generally annular portion rotatable about said inner portion.

3. The drive transmission of claim 2 wherein all of said inner portions are generally circular and mounted off-center on said one of said shafts, the inner portion of one of said cams being mounted generally diametrically off-center with respect to the inner portion of an adjacent cam.

4. The drive transmission of claim 1 wherein each of said resilient means is an extension spring.

5. The drive transmission of claim 1 wherein each of said resilient means is a compression spring.

6. In a bicycle having at least a frame, a rear driving wheel having a rear wheel sprocket mounted for rotation on said frame, a front wheel freely rotatable on said frame, and a pedal sprocket journaled for rotation in said frame, said bicycle including:

a housing mounted on said frame;

a pair of spaced shafts journaled for rotation within said housing;

a sprocket fixed for rotation with its respective shaft mounted on each of said shafts;

a first chain operatively engaging both said sprocket on one of said shafts and said pedal sprocket;

a plurality of spaced cams rotatably mounted on said shaft on which said sprocket operatively engaging said pedal sprocket is mounted, said cams being mounted off-center both on said last-mentioned shaft and with respect to one another;

a like plurality of spaced clutches mounted on the other of said shafts and rotatable thereon in only one direction, each of said clutches being aligned with its respective cam on the shaft on which said sprocket operatively engaging said pedal sprocket is mounted;

a second chain operatively engaging both said rear wheel sprocket and the sprocket mounted on the shaft on which said clutches are mounted; and a like plurality of resilient means operatively connected at one end to one of said cams and at the other end to the clutch aligned with said one of said cams for imparting rotation to its respective clutch in its one-way direction on its respective shaft when said shaft on which said cams are mounted is rotated by rotation of the pedal sprocket.

7. The bicycle of claim 6 wherein said cams are generally annular with an inner portion fixedly secured to said one of said shafts and an outer generally annular portion rotatable about said inner portion.

8. The bicycle of claim 7 wherein all of said inner portions are generally circular and mounted off-center on said one of said shafts, the inner portion of one of said cams being mounted generally diametrically off-center with respect to the inner portion of an adjacent cam.

9. The bicycle of claim 6 wherein each of said resilient means is an extension spring.

10. The bicycle of claim 6 wherein each of said resilient means is a compression spring.

11. The bicycle of claim 6 wherein the ratio between the pedal sprocket and said rear wheel ranges between about 1:5 and 1:1/2.

12. The bicycle of claim 11 wherein said ratio is varied relative to the resistance to turning put on the sprocket on which the clutches are mounted by the revolution of the rear wheel.

* * * * *